Figure 1:
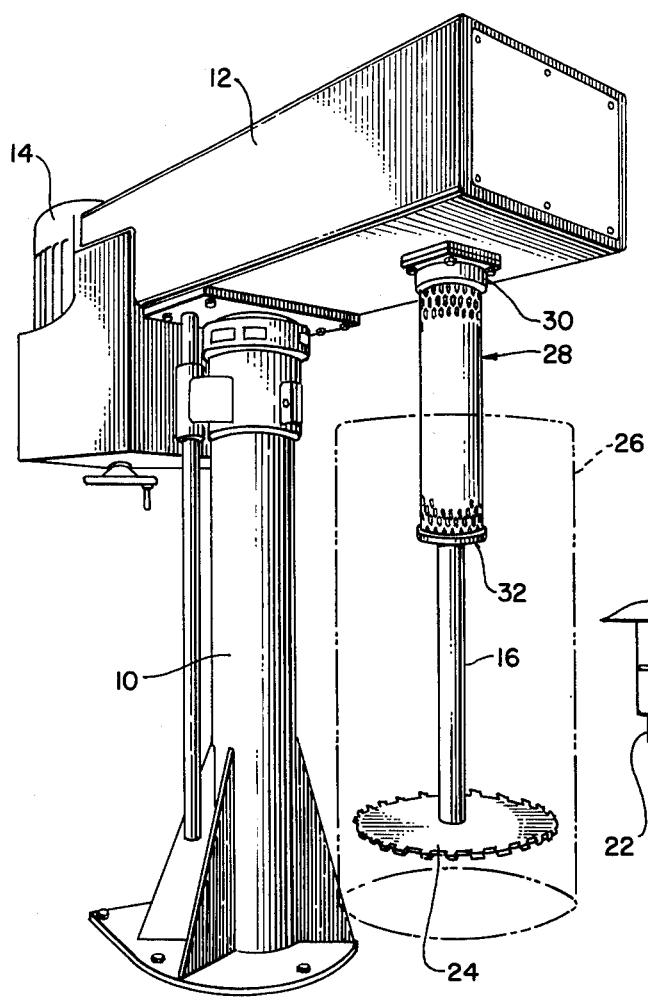

United States Patent [19]

Szkaradek

[11] 4,062,599
[45] Dec. 13, 1977

[54] SHAFT GUARD

[75] Inventor: Edward J. Szkaradek, Santa Ana, Calif.

[73] Assignee: Morehouse Industries, Inc., Fullerton, Calif.

[21] Appl. No.: 699,840

[22] Filed: June 25, 1976

[51] Int. Cl.² .............................................. B01F 7/16
[52] U.S. Cl. ..................................... 308/1 A; 366/197
[58] Field of Search ............... 308/1 R, 1 A; 259/107, 259/108, DIG. 16

[56] References Cited

U.S. PATENT DOCUMENTS

| 2,966,159 | 12/1960 | Ruegnitz | 259/108 X |
| 3,100,628 | 8/1963 | Norris | 259/107 |

FOREIGN PATENT DOCUMENTS

| 2,001,517 | 7/1971 | Germany | 259/107 |

Primary Examiner—Joseph F. Peters, Jr.
Assistant Examiner—Gene A. Church
Attorney, Agent, or Firm—Knobbe, Martens, Olson, Hubbard & Bear

[57] ABSTRACT

A tubular safety guard made of strong rigid material surrounds a rotating shaft in dispersion equipment to prevent inadvertent contact with the shaft. The guard is perforated substantially throughout its length so that the shaft is visible through the guard and so that the guard does not collect material in applications wherein the guard may be partially immersed such as in liquid mixing operations.

10 Claims, 2 Drawing Figures

U.S. Patent  Dec. 13, 1977  4,062,599

SHAFT GUARD

Industrial safety has always been an important subject; however, in recent years there has been particular emphasis on this including a significant increase in government regulations, inspections and other requirements. In meeting such requirements, it is of course, important that the approaches used by not only effective from a safety standpoint but also be practical from a standpoint of cost and not interfering with the work being performed.

One activity which can result in injury to people is that of rotating machinery such as a shaft extending between a motor, or other drive means, and a rotating element such as an impeller, pump rotor or other such mixing element. This problem has been of particular concern in connection with industrial mixing apparatus such as equipment for dispersing solid particles within liquid such as mixing pigments within paint. This operation is usually performed by a large impeller mounted on the end of a long shaft which is rotatably supported from above so that the shaft can extend into the mixing container. The upper end of the shaft extending between its support and the upper end of the container is thus exposed. Frequently, it is necessary for a workman to inspect the container contents while the mixing operation is under way. Thus, the upper end of the rotating shaft becomes a potential hazard in that the workman's hand or clothing might inadvertently be caught on the rapidly rotating shaft. This recently occured and the workman was actually dragged into the container and was seriously injured.

In an attempt to eliminate this hazard, one manufacturer has positioned a metal tube around the upper end of the shaft, extending into the container sufficiently far that the workman could not likely inadvertently contact the shaft. This measure, however, has been unsatisfactory because the paint or other material being mixed is thrown into the interior of the lower end of the guard. After a period of time, the material begins to collect on the inner wall at the lower end of the guard. When the mixing operation is underway, a vortex is typically created because of the high rotational speeds involved with the result that the lower end of the guard is not actually immersed in the liquid. However, when the operation is slowed or stopped, the lower end often is immersed. Consequently, the lower end of the guard is constantly undergoing a process of partial drying and adding of material so that an undesirable buildup can easily occur. This buildup can become so severe that it engages the shaft, which interferes with its rotation; but more importantly, friction is created which could cause a fire hazard in connection with the highly flamable material often being mixed. Another problem with this is that dried or partially dried material may brake away from the buildup and fall into the container. Such dried globs of material can usually not be dissolved or mixed and hence, lower the quality of the product.

Because of this, it is necessary to periodically clean the guard. Cleaning is often needed when the materials being mixed are changed, for example when switching from a dark colored paint to a light colored paint. The impeller and the exposed shaft can be cleaned fairly readily by simply being washed with a solvent. However, it is very difficult to clean the inside of a guard. Because of these problems, most manufacturers do not provide any protection, with the result that the hazard is not abated.

In accordance with the present invention, the foregoing problem is solved with the simple but clever step of using perforated metal or other rigid material for forming the guard which surrounds the shaft. The holes or perforations within the guard enable the operator to visually inspect the shaft to see whether there is any material buildup, but more importantly, the holes prevent appreciable buildup since the holes are sufficiently large such that there is no clogging within the holes. Consequently, only a small amount of material can actually coat the existing guard surfaces. Also, it is easy to clean the guard in that solvents can be sprayed from the exterior which will also wash the interior. Preferably, the guard is also coated with a material, such as teflon, which minimizes adherence of the substance being mixed.

Even with perforations being formed substantially throughout its length, the guard is sufficiently rigid and self-supporting that it can be mounted in cantilever fashion at its upper end where the rotating shaft is supported. As a further safety precaution, the guard may be attached to its support using the same means used for mounting the shaft bearings. This should minimize the possibility of a purchaser of the equipment attempting to use the apparatus without the guard in that removal of the guard will require special effort to make the equipment operational.

While the guard is particularly useful in connection with the mixing operation described above, it is of course, useful on any rotating shaft situation wherein it is desirable to have visual access to the shaft.

Figure 2:
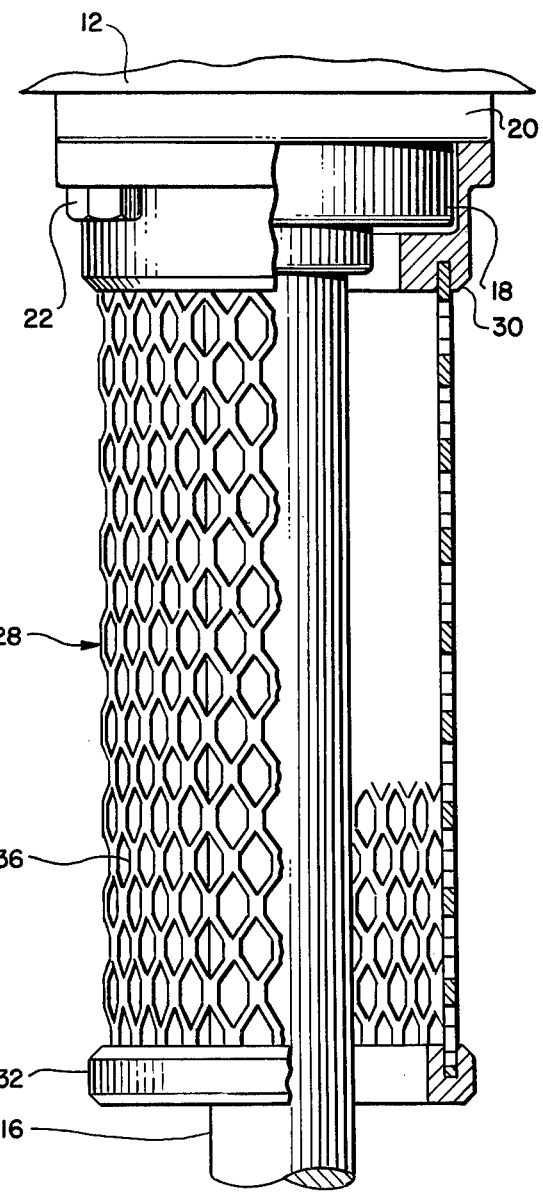

The invention is explained in greater detail in the following description and drawings wherein:

FIG. 1 is a perspective view of dispersion apparatus utilizing the guard of the invention; and FIG. 2 is an enlarged, partially sectionalized view of the guard on the upper end of the shaft.

The dispersion apparatus of FIG. 1 includes a support pedestal 10 carrying on its upper end an elongated bridge assembly 12. A large motor 14 is mounted on one end of the bridge and an impeller shaft 16 is mounted on the other end of the bridge by suitable bearings, the lower bearing housing 18 being seen in FIG. 2. Power is transmitted from the motor 14 to the shaft 16 by suitable belts and pulleys or other drive arrangements, which are not shown since conventional systems may be employed.

As can be seen from FIG. 2, the bearing housing 18 has attached thereto a flange 20 through which bolt 22 extends for supporting the shaft and its bearings in cantilever fashion on the bridge assembly 12. An impeller 24 is mounted on the lower end of the shaft 16. As shown in phantom lines, the impeller and the lower part of the shaft 16 are positioned within a large cylindrical mixing container 26.

In accordance with the invention, a cylindrical guard 28 surrounds and is spaced from the upper end of the shaft 16. The upper end of the guard 28 is attached to a mounting ring 30 which is bolted to the bearing housing by the bolts 22. A smaller ring 32 is attached to the lower end of the guard. As can be seen, the guard has a pattern of holes or perforations 36 extending throughout its length. The guard is preferably made of metal or other such material which is sufficiently rigid such that it can be attached in cantilever fashion at one end but will remain spaced from the shaft at its lower end even if considerable transverse force is applied. The holes 36 are small enough to prevent a person's hand from reaching through the guard and contacting the shaft but they are large enough such that liquid in the mixing container 26 will not adhere to the guard enough to clog the holes.

The diameter of the guard should be at least two inches larger than the shaft to minimize the risk of something being poked through the guard and engaging the shaft.

Preferably, the guard will be coated with a layer of Teflon or some such similar material which resists the adherence of paint or other liquids. The guard is painted a bright color, such as red, so that this will also serve to warn people to stay away from the rotating shaft.

The guard can be made as long as desired and if necessary, additional support for the guard can be provided. For example, further support can be added around its midsection and connected to the bridge assembly 12; or temporary supporting members can be connected to the top of the container 26. However, for most applications of the type illustrated, support simply at one end is quite adequate.

The guard should extend into the top of the container to provide an adequate shielding effect in dispersion apparatus of the type illustrated. The guard will typically extend about a quarter to one-half the length of the shaft. In any event, it should extend below the upper end of the container in that an operator may on occasion may lean over the edge of the container to inspect the contents. If this is done while the shaft is rotating at high speed, the vortex created in the liquid produces some suction effect. Thus, it is essential that the shaft be protected in that if an operator only touches the shaft momentarily, the force of the shaft plus the suction effect could cause a worker to be pulled into the container.

As explained above, the perforations minimize the buildup of liquid on the guard and greatly facilitates the cleaning when the liquids being mixed in the container are to be changed. The holes also permit the operator to inspect the condition of the interior of the guard and the shaft within it during cleaning operations or any other time.

As explained above, the mounting arrangement for the guard was selected so that it would not be tempting for the user of the equipment to remove the guard. With the guard being mounted by the bearing mounting bolts, the equipment is not operable if the guard is removed unless extra efforts are expended to reposition or tighten the bearing mount. If access to the upper end of the shaft is needed for lubricating the bearings, this can be accomplished without removing the guard by extending the tip of a grease gun through one of the perforation in the guard; or if the regular perforations are not large enough, an enlarged opening can be made for that purpose.

Dispersion apparatus of the general type illustrated is also sold without the pedestal 10 and the impeller is mounted on the center of the bridge assembly 12, which is then supported on the upper end of the mixing container. The guard 28 is of course, equally useful in that situation. With this arrangement, as with the pedestal mount shown in FIG. 1, the mixing container is often quite tall such that the operator must stand on a ladder to observe the interior of the container. This is always a precarious situation which, of course, adds to the importance of having the guard to shield the shaft.

In another form of the apparatus, the container is mounted below floor level so that the upper end of the container is perhaps only three or four feet above the floor. A ladder is therefore not required in this situation to inspect the contents of the container, but the guard is still very necessary and it may even be desirable to have a somewhat longer guard in that there may be some tendency for an operator to lean further into the container with this mounting arrangement.

While the guard has been illustrated and described in connection with industrial dispersion apparatus, wherein its lower end extends into liquid, the guard may be useful in any situation where there is a shaft or other rotating machinery which should be protected but yet, visibility of the shaft is desirable. In such applications, it may be convenient to support the guard on both ends.

What is claimed is:

1. Industrial apparatus for dispersing or mixing liquids comprising:

a support;

an impeller shaft having an impeller mounted on its lower end and having its upper end rotatably mounted in said support so that the impeller and a portion of the shaft can extend into a container holding liquids to be mixed; and a guard spaced from and surrounding the upper end of said shaft and extending downwardly sufficiently to prevent inadvertant contact with the rotating shaft over the upper end of the container, the upper end of said guard being sufficiently close to the support to prevent access to the shaft through the upper end of said guard, said guard being made of rigid material with many holes therein so that the guard does not collect much of the liquid being mixed within the container and the guard is easily cleaned.

2. The apparatus of claim 1 including means for attaching the upper end of the guard to said support.

3. The apparatus of claim 1 including bearing means for rotatably mounting the shaft in said support; and means for mounting said bearings on said support, the upper end of the guard being attached to said support by said bearing mounting means so that the guard cannot be removed without loosening the bearing mounting means.

4. The apparatus of claim 1 wherein said guard is coated with teflon or other such material which will minimize the adherence of liquid to said guard.

5. The apparatus of claim 1 wherein the holes in said guard are large enough to prevent the holes from being clogged with the liquid being mixed and small enough to prevent a person's hand from reaching the shaft through the guard.

6. The apparatus of claim 1 wherein the lower end of the guard extends substantially below the upper end of the container when in operation.

7. The apparatus of claim 1 wherein the length of said guard is about a quarter to one-half of the shaft length.

8. The apparatus of claim 1 wherein said guard has a cylindrical shape, the holes within the guard are formed in a pattern substantially throughout the guard material, the inner diameter of the guard is at least two inches greater than the outer diameter of said shaft.

9. Industrial apparatus for dispersing or mixing liquids comprising:

an impeller shaft having an impeller mounted on one end;

a support including means for rotatably mounting and supporting the other end of said shaft and means mounted on said support for rotating the shaft; and a tubular guard surrounding the upper end of said shaft with its upper end being attached to said support, the guard being made of rigid perforated material, the length of the guard being such that it extends below the top of the container holding the liquid to be mixed by said impeller, the guard being spaced from said shaft a distance sufficient to prevent clogging of liquid between the shaft and the guard, the perforations in the guard being sufficiently large to prevent clogging of the liquid in said perforations and sufficiently small to prevent a person's hand from reaching through the guard to contact the shaft.

10. The combination of a rotating member such as a shaft, and a fixed guard spaced from and surrounding said shaft to prevent inadvertant contact with the shaft, the ends of said guard being sufficiently close to other structure surrounding said shaft to prevent inadvertant contact with the shaft around the ends of the guard, said guard being rigid and sufficiently strong to be supported at only one end or at widely spaced locations along the length of the guard and said guard having a pattern of holes formed therein throughout a substantial part of its entire length, said holes being small enough to prevent a person's hand from reaching through the guard to contact the shaft.

* * * * *